US011960219B2

(12) United States Patent
Okumura et al.

(10) Patent No.: US 11,960,219 B2
(45) Date of Patent: Apr. 16, 2024

(54) IMAGE FORMING APPARATUS FOR FORMING IMAGES ON SHEETS BY USING TONER

(71) Applicant: CANON KABUSHIKI KAISHA, Tokyo (JP)

(72) Inventors: Shohei Okumura, Tokyo (JP); Shinya Suzuki, Chiba (JP); Masahiro Tsujibayashi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/979,934

(22) Filed: Nov. 3, 2022

(65) Prior Publication Data

US 2023/0145679 A1 May 11, 2023

(30) Foreign Application Priority Data

Nov. 11, 2021 (JP) ................................ 2021-184235

(51) Int. Cl.
*G03G 15/06* (2006.01)
*G03G 15/00* (2006.01)

(52) U.S. Cl.
CPC ....... *G03G 15/065* (2013.01); *G03G 15/5058* (2013.01); *G03G 2215/00059* (2013.01); *G03G 2215/0164* (2013.01)

(58) Field of Classification Search
CPC .................................................... G03G 15/065
See application file for complete search history.

(56) References Cited

U.S. PATENT DOCUMENTS

| | | | | |
|---|---|---|---|---|
| 7,539,429 | B2 * | 5/2009 | Shimizu | G03G 15/04045 399/49 |
| 9,606,469 | B2 * | 3/2017 | Izumi | G03G 15/5058 |
| 2020/0125011 | A1 * | 4/2020 | Murakami | G03G 21/0094 |

FOREIGN PATENT DOCUMENTS

| | | | | |
|---|---|---|---|---|
| JP | 2000-098675 | A | | 4/2000 |
| JP | 2014240922 | A | * | 12/2014 |

* cited by examiner

*Primary Examiner* — Leon W Rhodes, Jr.
(74) *Attorney, Agent, or Firm* — VENABLE LLP

(57) ABSTRACT

An image forming apparatus controls a generation circuit to modulate a DC component of a developing voltage based on a first correction component such that a density unevenness is reduced. The image forming apparatus further restricts the first correction component for modulating the DC component of the developing voltage such that fogging of toner that may occur on a non-exposure region which is not exposed by an exposure unit and adhesion to a photosensitive member of carrier included in a developer are reduced.

12 Claims, 14 Drawing Sheets

IMAGE FORMING APPARATUS FOR FORMING IMAGES ON SHEETS BY USING TONER

BACKGROUND OF THE INVENTION

Field of the Invention

The present invention relates to an image forming apparatus for forming images on sheets by using toner.

Description of the Related Art

In recent years, image forming apparatuses of an electrophotographic type have started to become popular in the printing industry, and the demand for high speed output and improvements in image quality have rapidly increased. Among requirements related to improving image quality, in particular, uniformity of image density (suppression of density unevenness) on a page is attracting attention. Density unevenness may periodically occur due to an unevenness of rotation of a rotating body such as a developing sleeve, a photosensitive drum, and a charging roller, for example. According to Japanese Patent Laid-Open No. 2000-098675, a method of correcting such periodic density unevenness has been proposed. In particular, according to the above patent publication, modulating a developing voltage or a charging voltage so as to cancel out the periodic density unevenness is described.

However, when the charging voltage or the developing voltage is modulated in order to improve the periodic density unevenness occurring on the developing sleeve, fogging may occur and a carrier of a two-component developer may excessively adhere to the photosensitive drum. Fogging is a phenomenon in which toner adheres to an unexposed region of the surface of the photosensitive drum. When the carrier adheres to the photosensitive drum more than expected, the carrier hinders the transfer of the toner, and the time for cleaning or replacement of a cleaning member that cleans the surface of the photosensitive drum becomes sooner.

SUMMARY OF THE INVENTION

The present disclosure provides an image forming apparatus comprising: a photosensitive member; a charging device configured to charge a surface of the photosensitive member to be uniformly charged; an exposure device configured to form an electrostatic latent image by exposing the surface of the photosensitive member; a developing unit having a developing rotary member that forms a toner image onto the surface of the photosensitive member by causing toner included in a developer to adhere to the electrostatic latent image; a transfer unit configured to transfer the toner image onto a sheet or an intermediate transfer member; a first sensor configured to detect a density unevenness of the toner image; a generation circuit configured to generate a developing voltage, which is a developing bias applied to the developing rotary member, that includes a direct current (DC) component and an alternating current (AC) component, and a charging voltage supplied to the charging device; and a controller configured to control the generation circuit to modulate the DC component of the developing voltage based on a first correction component such that the density unevenness is reduced, wherein the controller is further configured to restrict the first correction component for modulating the DC component of the developing voltage, such that fogging of toner that may occur on a non-exposure region which is not exposed by the exposure unit and adhesion to the photosensitive member of carrier included in the developer, which is a source of the toner image, are reduced.

Further features of the present invention will become apparent from the following description of exemplary embodiments (with reference to the attached drawings).

DESCRIPTION OF THE EMBODIMENTS

Figure 1:
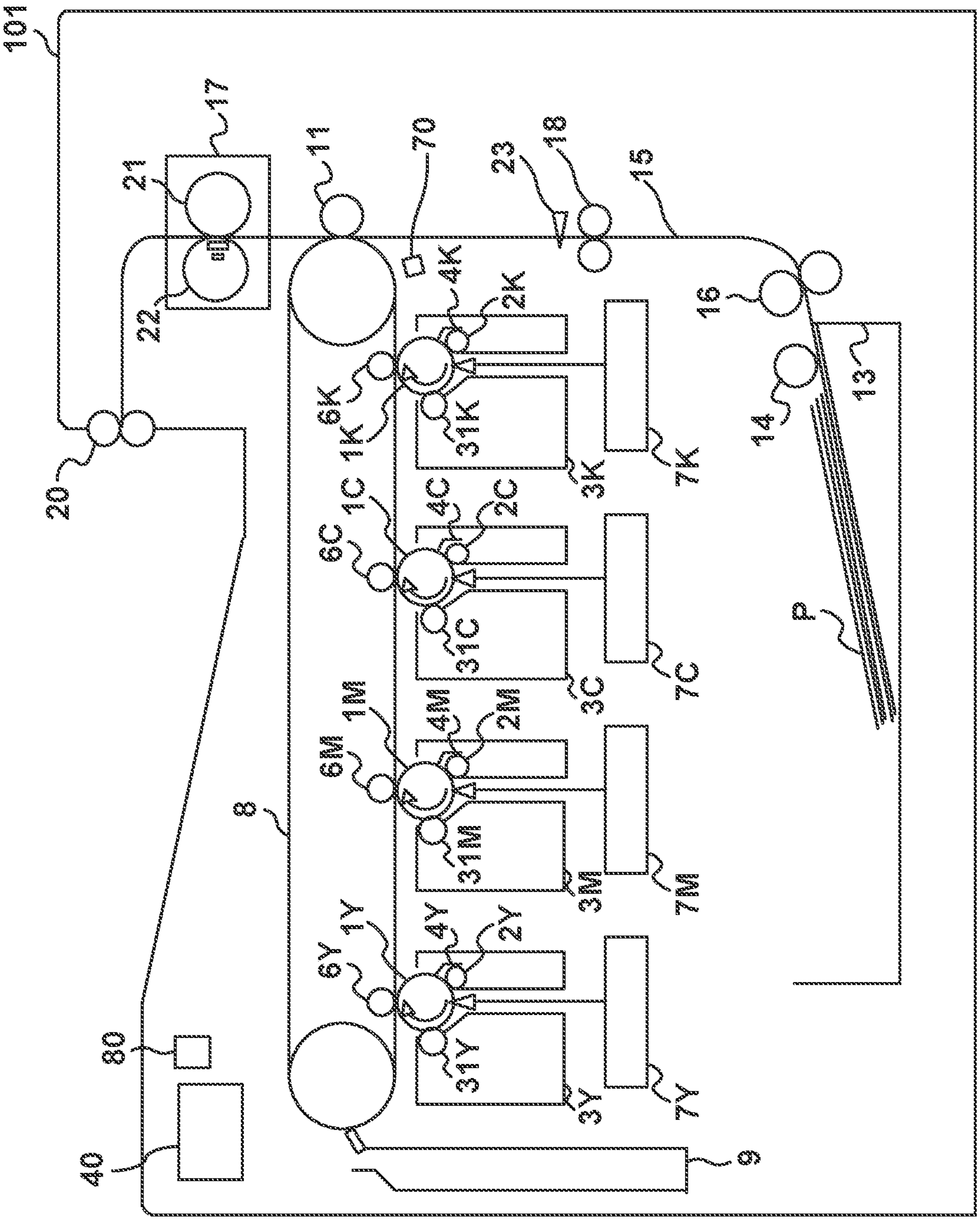
FIG. 1 is a view for describing an image forming apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

[Image Forming Apparatus]

The characters Y, M, C, and K appended to the end of the reference numerals in FIG. 1 indicate a color of toner, such as yellow, magenta, cyan, and black. For example, a constituent component with a Y appended to the end of a reference numeral is involved in the formation of a yellow toner image. In a case where there is no need to distinguish colors in the description of the constituent component, reference numerals are used in which the letters at the end are omitted.

An image forming apparatus 101 is a copying machine, a multifunction peripheral, a printer, or the like that forms an image on a printing material (hereinafter, referred to as a sheet) using an electrophotographic process. A control circuit 40 is a controller that controls each unit of the image forming apparatus 101. For example, the control circuit 40 converts the image data to generate an image signal, and supplies the image signal to an exposure apparatus 7. A photosensitive member 1 is an image carrier that rotates in a clockwise direction by being driven by a driving source such as a motor and carries an electrostatic latent image and a toner image. Since the photosensitive member 1 is a cylindrical rotating body, it is sometimes referred to as a photosensitive drum. The charging roller 2 charges the surface of the photosensitive member 1 to become charged to a uniform potential (dark portion potential Vd) by a charging bias Vc being applied by the control circuit 40. The exposure apparatus 7 irradiates the photosensitive member 1 with a laser beam corresponding to an image signal, thereby forming an electrostatic latent image on the surface (peripheral surface) of the photosensitive member 1. A developing bias Vdc is applied to the developing sleeve 31 of the developing device 3, and the developing sleeve 31 causes toner to adhere to the electrostatic latent image to form a toner image on the surface of the photosensitive member 1. It is assumed that the developer contained in the developing device 3 is a two-component developer having toner and a carrier. A primary transfer bias is applied to the primary transfer roller 6 by the control circuit 40, and the primary transfer roller 6 transfers the toner image from the photosensitive member 1 to the intermediate transfer belt 8. The drum cleaner 4 is a member that removes and collects toner remaining on the photosensitive member 1 that was not transferred to the intermediate transfer belt 8. The photosensitive member 1, the developing sleeve 31, the charging roller 2, and the drum cleaner 4 may be housed and integrated in a cartridge. Such a cartridge is configured to be detachable from the main body of the image forming apparatus 101. The photosensitive member 1, the charging roller 2, the exposure apparatus 7, the developing sleeve 31, and the primary transfer roller 6 function as an image forming unit that forms an image on the intermediate transfer belt 8.

The intermediate transfer belt 8 is an endless belt and may also be referred to as an intermediate transfer member. The intermediate transfer belt 8 is driven by a driving source such as a motor and rotates counterclockwise. A full-color toner image is formed on the intermediate transfer belt 8 by each toner image from the four photosensitive members 1 being transferred onto the intermediate transfer belt 8 in a superimposed manner. The toner image transferred onto the intermediate transfer belt 8 is conveyed to the secondary transfer unit. The secondary transfer portion is a nip portion formed by the intermediate transfer belt 8 and the secondary transfer roller 11.

The image forming apparatus 101 includes a feeding cassette 13 that is a feed tray for feeding sheets. The feeding cassette 13 is a container for storing a large number of sheets P. The feeding roller 14 feeds a sheet P from the feeding cassette 13 to the conveying path 15 in accordance with an instruction from the control circuit 40. The sheet P is conveyed to the secondary transfer unit by conveyance rollers 16 and 18 provided along the conveyance path 15. The conveyance roller 18 may also be referred to as a registration roller. A sheet sensor 23 may be provided downstream of the conveyance roller 18 in the conveyance direction of the sheet P.

The secondary transfer roller 11 has a secondary transfer bias applied by the control circuit 40, and transfers the toner image from the intermediate transfer belt 8 onto the sheet P. The belt cleaner 9 removes and collects the toner remaining on the intermediate transfer belt 8 that was not transferred to the sheet P. The secondary transfer roller 11 conveys the sheet P to a fixing apparatus 17. The fixing apparatus 17 includes two rotating bodies (a fixing roller 22 and a pressure roller 21), and causes a toner image to be fixed on the sheet P by applying heat and pressure to the sheet P and the toner image. The sheet P is conveyed to the discharge roller 20 by the fixing roller 22 and the pressure roller 21 rotating. The discharge roller 20 discharges the sheet P to the outside of the image forming apparatus 101.

A density sensor 70 detects the density of a test image formed on the surface of the intermediate transfer belt 8. An environment sensor 80 detects an environmental condition (for example, temperature, humidity, or absolute water content) of the environment in which the image forming apparatus 101 is installed.

[Development Gamma Characteristic and Vback Latitude]

Figure 2:
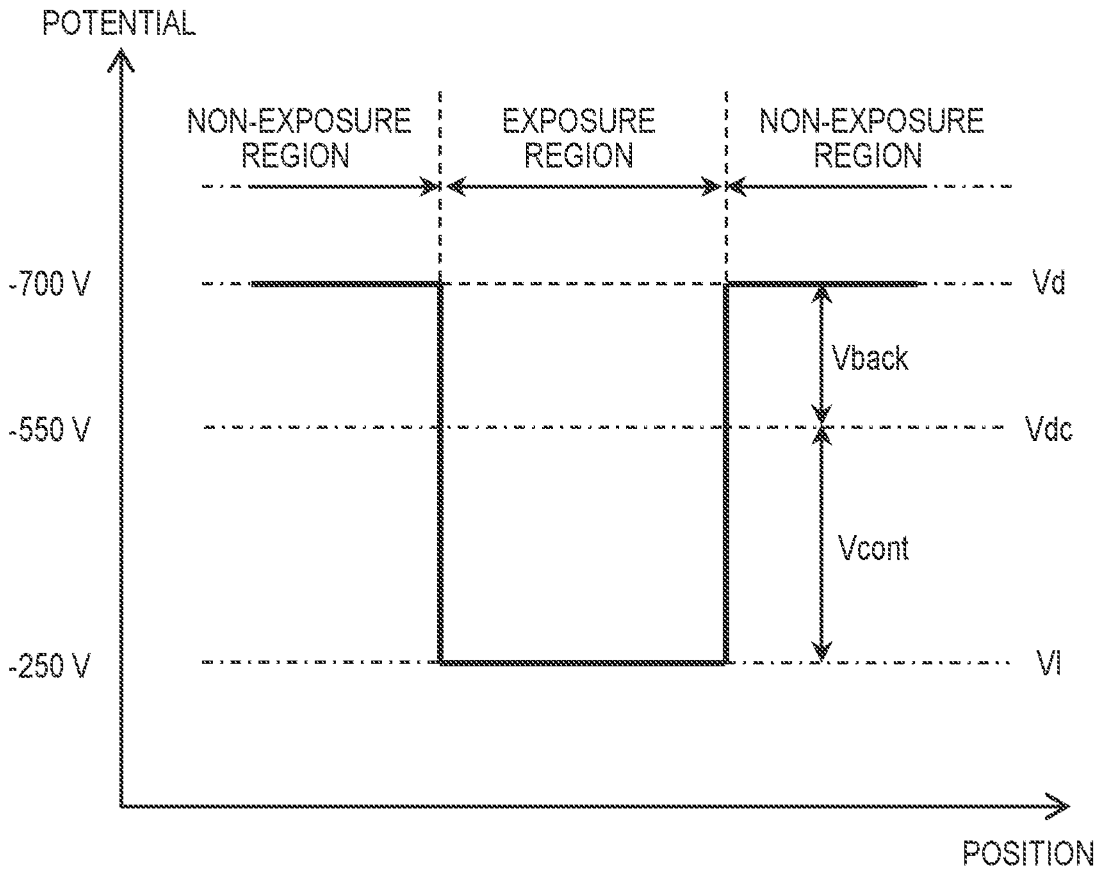
FIG. 2 is a view illustrating various potentials for development.

FIG. 2 shows a relationship between the potential of the photosensitive member 1 and the developing bias in the developing device 3 in a case where correction of density unevenness is not performed. The surface of the photosensitive member 1 has an exposure region, which is a region irradiated with laser light, and a non-exposure region, which is a region not irradiated with laser light. The surface potential of the non-exposure region is called the charging potential (dark portion potential Vd). The potential of the exposure region is called the exposure potential (light portion potential Vl). The DC component of the developing voltage applied to the developing sleeve is referred to as a developing bias Vdc. In this embodiment, in order to improve developability, an AC component is superimposed on the developing voltage in addition to the DC component. For example, the frequency of the AC component is 1.4 kHz and the peak-to-peak voltage of the AC component is 1.5 kV. As described above, although the developing voltage includes a DC component and an AC component, the DC component is referred to as a developing bias in this specification.

As shown in FIG. 2, a developing contrast Vcont is defined as the potential difference (voltage) between the light portion potential Vl and the developing bias Vdc. The developing contrast Vcont is an indicator of a toner driving force in the developing device 3. The larger the developing contrast Vcont, the more toner adheres to the photosensitive member 1. As a result, the image density increases. As FIG. 2 shows, a fogging removal voltage Vback is defined as the potential difference between the developing bias Vdc and the dark portion potential Vd.

Figure 3:
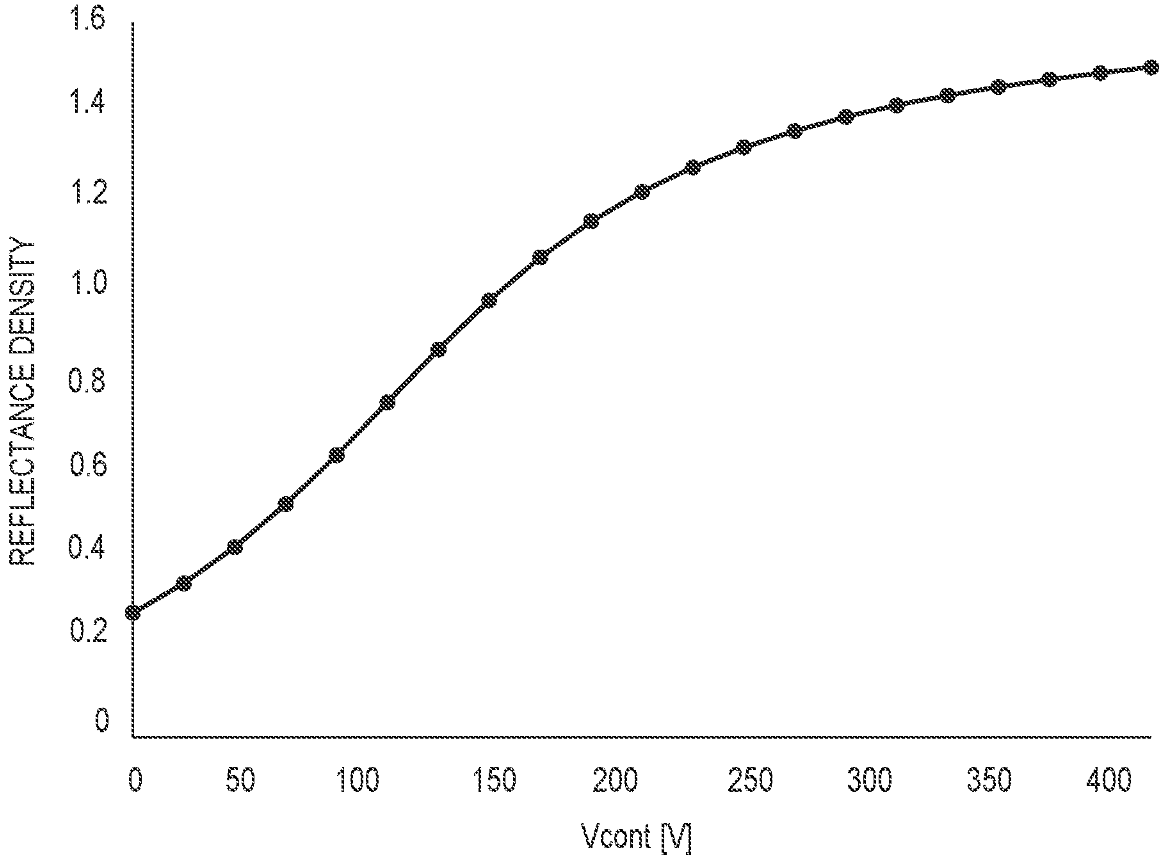
FIG. 3 is a view illustrating a development gamma characteristic.

FIG. 3 shows a relationship between the developing contrast Vcont and the reflectance density of the toner images (hereinafter referred to as a development gamma characteristic). The horizontal axis represents the developing contrast Vcont. The vertical axis represents reflectance density. As the developing contrast Vcont increases, the reflectance density of the toner image also increases.

"Fogging" is a phenomenon in which toner adheres to a non-exposure region of the photosensitive member 1. When the fogging removal voltage Vback is small, the amount of toner that adheres to the non-exposure region will increase. When the fogging removal voltage Vback is large, the amount of carrier that adheres to the non-exposure region will increase. The fogging results in toner image that is not present in the original image, which causes the image quality to decrease. Excessive adhesion of the carrier to the photosensitive member 1 causes the transferring capability of the image of the primary transfer portion to be reduced and causes the cleaning performance of the drum cleaner 4 to be reduced. Therefore, the fogging removal voltage Vback needs to be set within an appropriate range (hereinafter, referred to as a Vback latitude).

Figure 4:
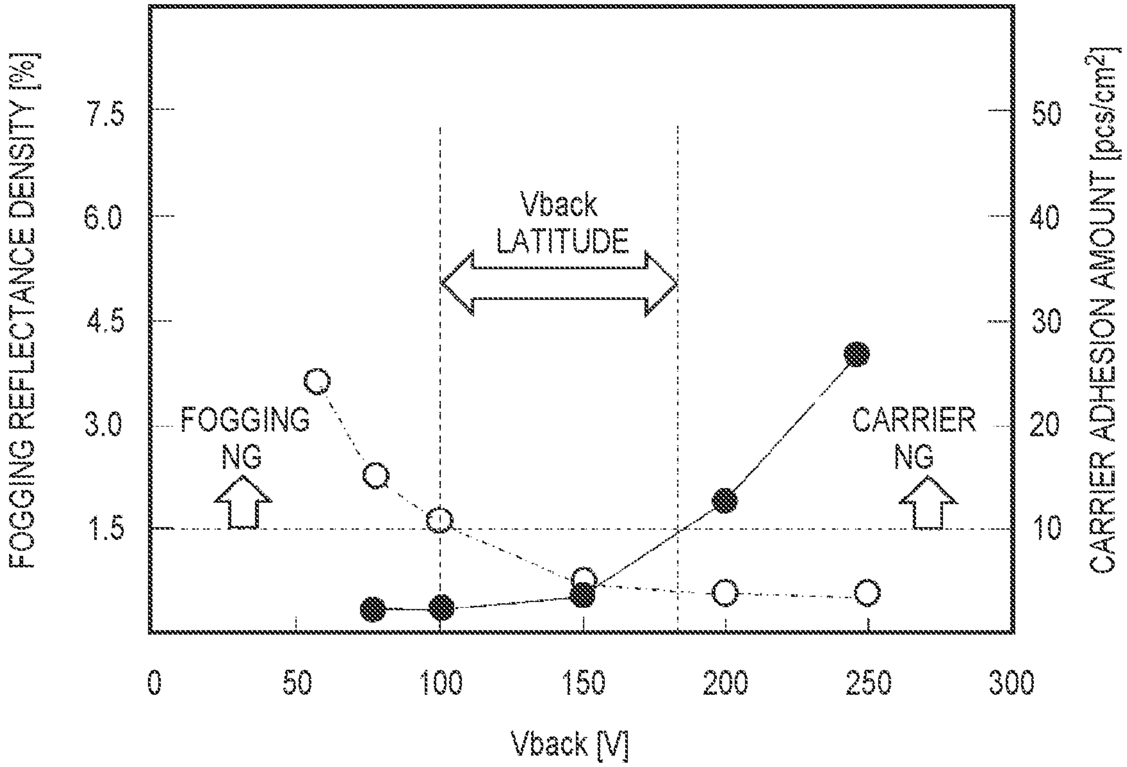
FIG. 4 is a view for describing a Vback latitude.

FIG. 4 shows a relationship between the fogging removal voltage Vback and the reflectance density, and the relationship between the fogging removal voltage Vback and amount of carrier adhered. The horizontal axis indicates the fogging removal voltage Vback. The vertical axis on the left indicates the reflectance density of the fogging. The vertical axis on the right indicates the amount of carrier adhered. White circles show the relationship between the fogging removal voltage Vback and reflectance density. Black circles show the relationship between the fogging removal voltage Vback and the amount of carrier adhered.

The Vback latitude refers to the range of the fogging removal voltage Vback in which the reflectance density of the fogging on the photosensitive member 1 and the amount of carrier adhered on the photosensitive member 1 satisfy a predetermined condition. In the first embodiment, the range of the fogging removal voltage Vback that satisfies the reflectance density of the fogging on the photosensitive member 1 being 1.5% or less and the amount of carrier adhered on the photosensitive member 1 being 10 [1/cm$^2$] or less is defined as the Vback latitude. In other words, the Vback latitude is the difference between the acceptable lower limit of Vback and the acceptable upper limit of Vback. A margin may also be considered for the Vback latitude. In this case, a Vback latitude in which a margin is considered is calculated by subtracting the margin from the original Vback latitude. In the case illustrated in FIG. 4, the fogging removal voltage Vback, which satisfies the condition consisting of the reflectance density of fogging and the amount of carrier adhered, has a lower limit of 100 V and an upper limit of 180 V. That is, the Vback latitude is 80 V. In a case where the margin is 10 V, the lower limit of the fogging removal voltage Vback is 105 V and the upper limit of the fogging removal voltage Vback is 175 V. Therefore, the Vback latitude is 70 V. Hereinafter, the Vback latitude is described as a Vback latitude in which a margin is considered.

[Detection of a Test Image]

As illustrated in FIG. 1, the image forming apparatus 101 includes a density sensor 70 that detects the reflectance of the intermediate transfer belt 8. The density sensor 70 may include four reflective optical sensors corresponding to yellow, magenta, cyan, and black. The four sensors have basically the same configuration.

Figure 5:
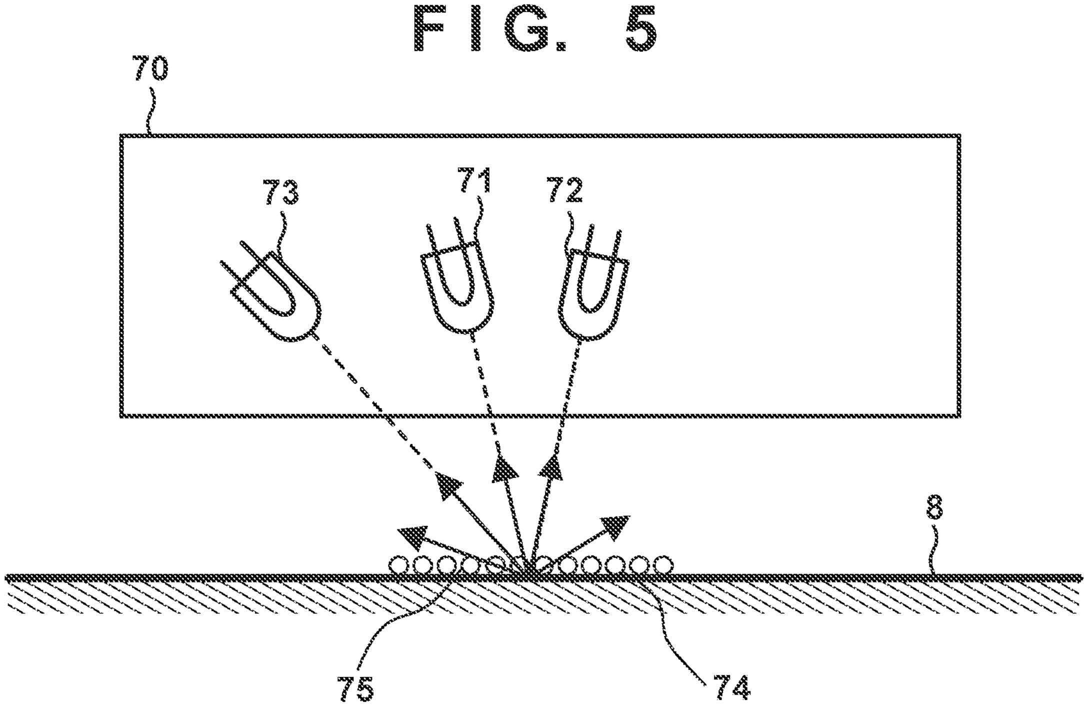
FIG. 5 is a view illustrating a configuration example of a density sensor.

As shown in FIG. 5, the density sensor 70 is arranged to face the intermediate transfer belt 8. An LED 71 is a light-emitting diode (light source) that outputs infrared light. PDs 72 and 73 are light-receiving elements (for example, photodiodes) that receive reflected light 75 reflected on the intermediate transfer belt 8 or the toner pattern 74. The incident angle of the infrared light from the LED 71 toward the intermediate transfer belt 8 is 20°. The PD 72 receives specular reflected light having an angle of reflection of −20° from the reflected light originating from the light irradiated on the intermediate transfer belt 8 and the toner pattern 74. The PD 73 receives diffuse reflected light having an angle of reflection of 50°. The angle of incidence and the angle of reflection are merely examples.

The density sensor 70 may include a driving circuit that supplies a current to the LED 71, and an IV conversion circuit that converts the current flowing through the PD 72 and the PD 73 into a voltage in accordance with the amount of received light.

[Phase Detection]

Figure 6:
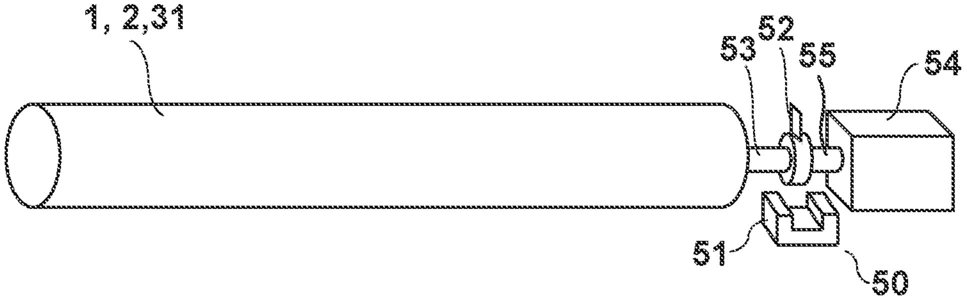
FIG. 6 is a view illustrating a configuration example of a phase sensor.

As shown in FIG. 6, the photosensitive members 1Y to 1K, the charging rollers 2Y to 2K, and the developing sleeves 31Y to 31K may be provided with a phase sensor 50 for detecting a rotational phase. An output shaft 55 of a motor 54 is connected to a shaft 53 that forms a rotation center of a rotating body such as the photosensitive member 1 via a coupling mechanism or the like. The phase sensor 50 includes a photo interrupter 51 and a light shielding member 52. A light shielding member 52 is integrally provided with the shaft 53, and is rotationally moved along with the rotation of the shaft 53. When the light shielding member 52 comes to a predetermined rotational position by the rotation of the shaft 53, the light shielding member 52 is detected by the photo interrupter 51. The phase sensor 50 detects the rotational phase of the rotating body based on the output of the photo interrupter 51.

In the example shown in FIG. 6, a direct drive system in which the shaft 53 of the photosensitive member 1 and the output shaft 55 of the motor 54 are directly connected is adopted, but this is merely an example. A speed reduction mechanism may be inserted between the shaft 53 of the photosensitive member 1 and the output shaft 55 of the motor 54. A similar driving method can be adopted for the charging roller 2 and the developing sleeve 31. However, the charging roller 2 may rotate following the photosensitive member 1, and in this case, the motor 54 for the charging roller 2 is not required. Also, in a case where a charging member of another form is adopted in place of the charging roller 2, the motor 54 and the phase sensor 50 for the charging roller 2 are not required.

Figure 7:
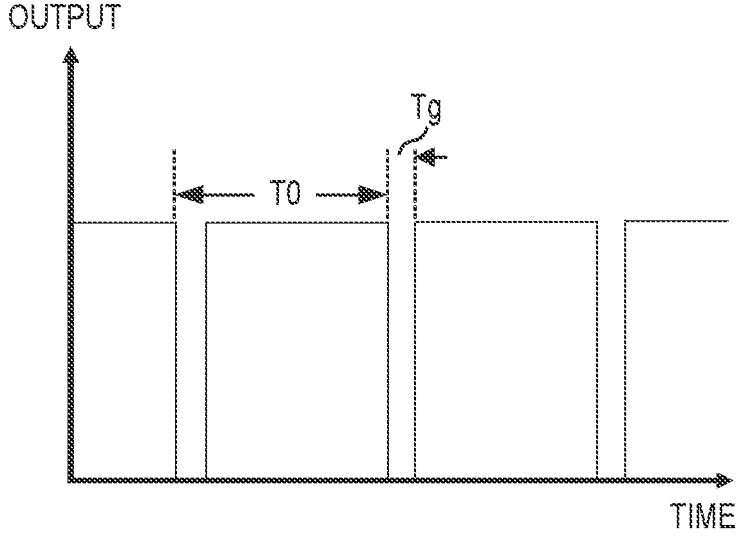
FIG. 7 is a view illustrating an output signal of the phase sensor.

FIG. 7 shows an output example of the photo interrupter 51. The light shielding member 52 rotates in synchronization with a rotating body such as the photosensitive member 1. When the light shielding member 52 passes through the photo interrupter 51, the output of the photo interrupter 51 decreases to approximately 0 V. The falling edge of the output at this time is defined as a home position of the rotational phase of the photosensitive member 1. The period from one falling edge to the next falling edge is one period TO. The period in which the light shielding member 52 passes through the photo interrupter 51 is Tg. One period of TO corresponds to 2π at the rotational phase. Therefore, the relative rotational phase with respect to the home position can be calculated.

[Controller]

Figure 8:
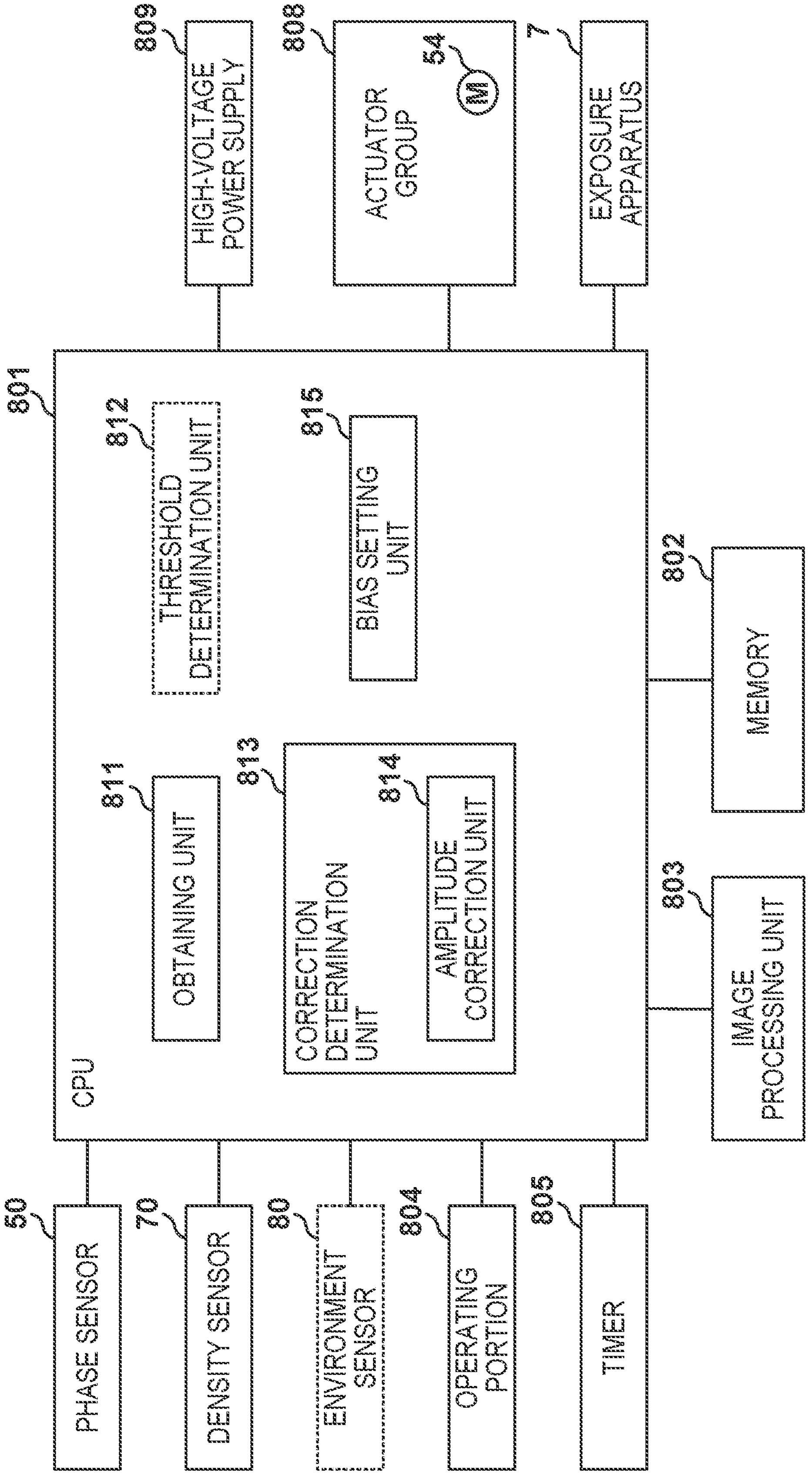
FIG. 8 is a view for describing a control apparatus.

FIG. 8 shows an example of the control circuit 40. A CPU 801 is a processing circuit that controls the image forming apparatus 101 in accordance with a control program stored in a ROM (read-only memory) of a memory 802. The memory 802 may include a RAM (random access memory) or the like. An image processing unit 803 converts image data outputted from an external computer or an image reader and generates an image signal for the exposure apparatus 7. Furthermore, the image processing unit 803 may be configured to generate an image signal of a test image for measuring density unevenness.

The CPU 801 causes the density sensor 70 to detect a test image formed on the intermediate transfer belt 8, creates a profile of density unevenness based on the detection result of the density sensor 70, and causes the profile to be stored in the memory 802. Note that the CPU 801 may be in charge of controlling the turning on and off of the LED 71 of the density sensor 70, the converting of signals outputted from the PDs 72 and 73, and the like. The CPU 801 uses the environment sensor 80 to obtain environment data of the image forming apparatus 101. The CPU 801 calculates the rotational phase of the rotor by using the output signal of the phase sensor 50 and a timer 805. An operation unit 804 includes a display apparatus that outputs information to a user, and an input device that receives instructions from the user. An actuator group 808 includes a motor 54, a solenoid, and the like provided within the image forming apparatus 101. A high-voltage power supply 809 is a power supply circuit that generates various high voltages required by an image forming process such as a charging bias, a developing bias, and a transfer bias.

The CPU 801 realizes various functions by executing a control program. An obtaining unit 811 creates a profile by associating the rotational phase (phase Φ) detected by the phase sensor 50 with the density (amplitude D) outputted from the density sensor 70, and stores the profile in the memory 802. A threshold determination unit 812 determines a threshold Vth required by a correction determination unit 813 based on an environmental condition. For example, the threshold Vth may be half of the Vback latitude. Thus, if the Vback latitude is 70 V, the threshold Vth is determined to be 35 V. The correction determination unit 813 determines a correcting bias ΔVdc for correcting the developing bias Vdc based on the profile and the threshold Vth. The correcting bias ΔVdc is a correction component used to modulate the developing bias Vdc. The correction component may be, for example, a function of time or a function of rotational phase, similar to a profile. The correction determination unit 813 determines a correcting bias ΔVc for correcting the charging bias Vc based on the profile and the threshold Vth'. The correcting bias ΔVc is a correction component used to modulate the charging bias Vc.

In a case where the amplitude Va of the correcting bias ΔVdc exceeds the threshold Vth, the amplitude correction unit 814 corrects the amplitude Va to a value equal to or less than the threshold Vth. Note that since the developing bias Vdc is a DC component of the developing voltage, the amplitude Va of the correcting bias ΔVdc and the amplitude of the modulated developing bias Vdc are the same value. In a case where the amplitude Vb of the correcting bias ΔVc exceeds the threshold Vth', the amplitude correction unit 814 corrects the amplitude Vb to a value equal to or less than the threshold Vth'. A bias setting unit 815 sets the high-voltage power supply 809 so that the developing bias Vdc and the charging bias Vc are outputted. The bias setting unit 815 adds the correcting bias ΔVdc to the initial value of the developing bias Vdc and adds the correcting bias ΔVc to the initial value of the charging bias Vc. Thus, the high-voltage power supply 809 outputs the modulated developing bias Vdc and the modulated charging bias Vc. For example, it is assumed that the initial value of the dark portion potential Vd is −700 V and a tolerable range of the Vback is greater than or equal to −595 V and is less than or equal to −525 V. In this case, if the Vback latitude is 70 V, the threshold Vth is determined to be 35 V. The initial value of the developing bias Vdc is −560 V. The amplitude Va of the correction component ΔVdc is restricted (reduced) if the amplitude Va of the correction component ΔVdc (that is, the amplitude Va of the developing bias Vdc modulated by the correction component ΔVdc) exceeds 35 V.

It is not required that both the developing bias Vdc and the charging bias Vc be modulated, and either one may be modulated. Configuration may be such that in a case where the density unevenness is very low, both the developing bias Vdc and the charging bias Vc are not modulated.

[Correction of Density Unevenness]

Figure 9:
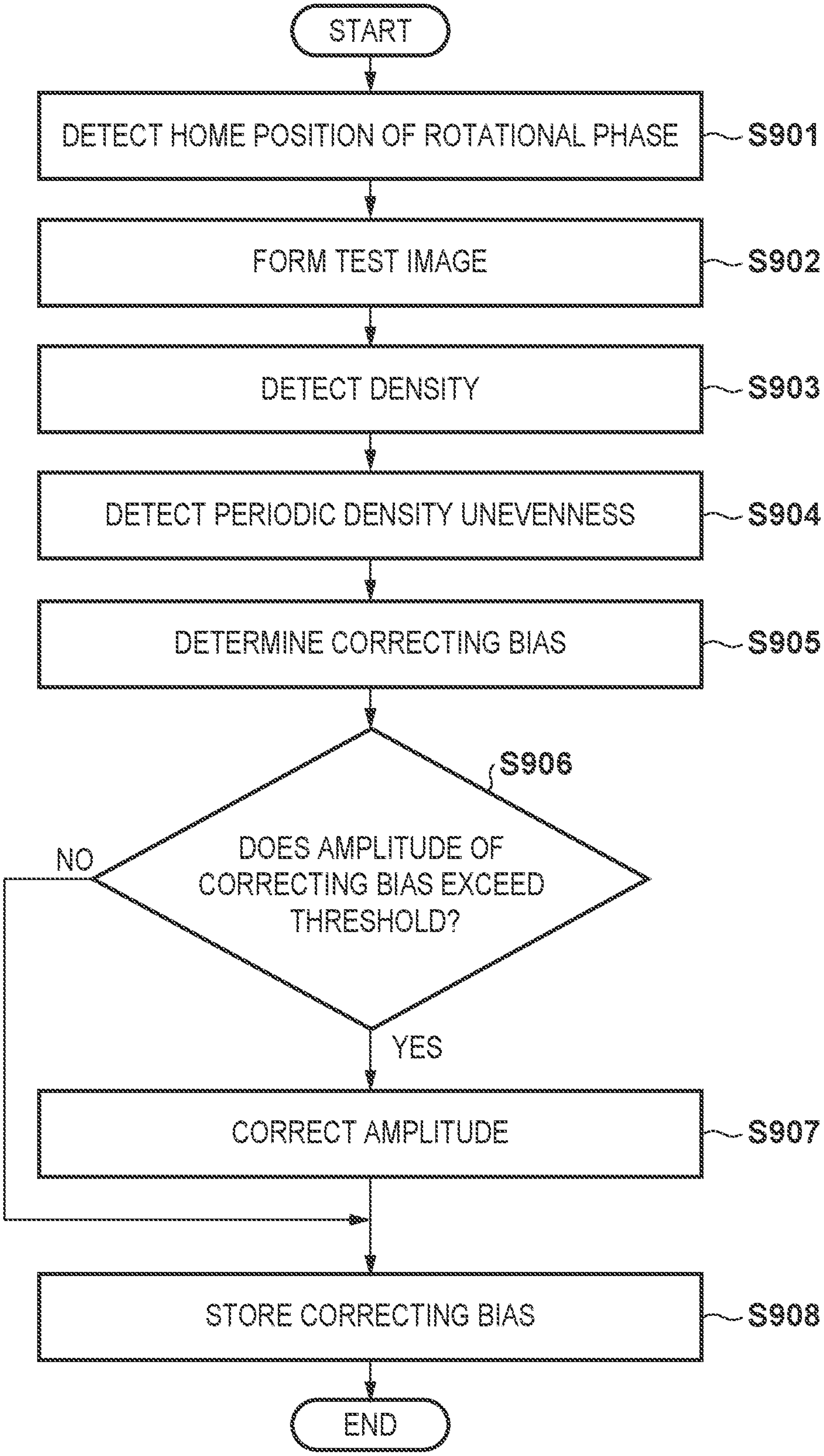
FIG. 9 is a flowchart illustrating a method for correcting density unevenness.

FIG. 9 is a flowchart illustrating a method of correcting density unevenness according to the first embodiment. The density unevenness correction is a process of correcting an image forming condition (process condition) so as to reduce density unevenness based on a detection result of a test image. Specifically, the density of a test image formed at a constant developing bias Vdc is detected. Next, an unevenness component based on the rotation period of the developing sleeve 31 included in the density unevenness is extracted from the detection result. The modulation method of the developing bias Vdc is determined, based on the extraction result, such that the density unevenness caused by the developing sleeve 31 is offset.

Incidentally, when the developing bias Vdc is modulated, the fogging removal voltage Vback changes with respect to the developing bias Vdc. Therefore, it is necessary to modulate the developing bias Vdc so that the amplitude Va of the modulated developing bias Vdc does not deviate from the tolerable range (Vback latitude). Thus, balance is achieved for the reduction of density unevenness, the reduction of fogging, and the suppression of carrier adhesion.

When the predetermined starting condition is satisfied, the CPU 801 executes the following process. Note that the predetermined start condition may be that an explicit start instruction is input from the operation unit 804, that a consumable part or the like is replaced, that a cumulative number of formed images reaches a predetermined number, or the like.

In step S901, the CPU 801 detects the home position of the rotational phase of the developing sleeve 31 based on the detection result of the phase sensor 50. The CPU 801 may store the relationship between the timing of the home position and the position of the test image in the memory 802. This relationship may indicate a time difference (waiting time) from the timing at which the home position is detected to the timing at which the test image is detected by the density sensor 70. That is, the CPU 801 may start sampling the density by the density sensor 70 at a timing when the standby time has elapsed from the timing when the home position is detected.

Figure 10:
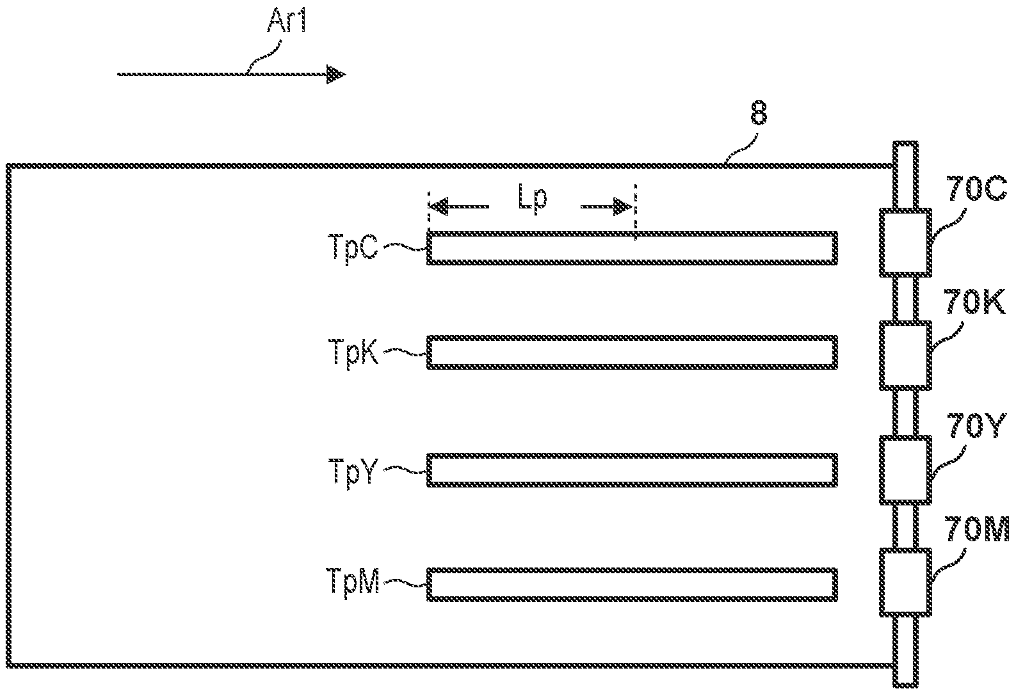
FIG. 10 is a view for describing test images.

In step S902, the CPU 801 forms a test image on the intermediate transfer belt 8 without modulating the developing bias Vdc. FIG. 10 shows an overview of test images Tp. The test images Tp are monochromatic, single-gradation, band-shaped images extending along the sub-scanning direction Ar1. A gradation level at which the slope of the development gamma characteristic shown in FIG. 3 is large is set as the gradation level of the test images Tp. This makes it possible to detect density unevenness generated in the developing device 3 with high sensitivity. In the first embodiment, the density of the test image of each color is set to 50% of the maximum image density.

As shown in FIG. 10, four density sensors 70Y to 70K are arranged to simultaneously detect test images of four colors. The four density sensors 70Y to 70K are arranged at different positions in a main scanning direction perpendicular to the sub-scanning direction Ar1. Incidentally, one cause of density unevenness periodically occurring in the sub-scanning direction Ar1 is that there are a plurality of rotating bodies. The circumferential lengths of the plurality of rotating bodies are generally different. For example, the circumferential length Lp of the photosensitive member 1 is longer than the circumferential length of the developing sleeve 31 and the circumferential length of the charging roller 2. That is, density unevenness that occurs at the maximum circumferential length must be detectable for the test image. Therefore, the length of the test images Tp in the sub-scanning direction is set to be at least twice the circumferential length Lp of the photosensitive member 1. The test images Tp of such a length can also reduce the effects of suddenly occurring streaky toner images, other noise images, uneven reflectance of the intermediate transfer belt 8, which is the substrate of the test images Tp, and the like.

In step S903, the CPU 801 detects the density of the test images Tp by the density sensors 70. The densities of the cyan, magenta, and yellow test images TpC, TpM, and TpY are measured by the PD 73 which receives diffuse reflected light. The density of the black test image TpK is measured by the PD 72 which receives specular reflected light. The PD 72 detects both a specular reflected light component and a diffuse reflected light component. Accordingly, the CPU 801 removes the diffuse reflected light component detected by the PD 73 from the detection results of the PD 72, thereby obtaining the specular reflected light component. A lot of light is reflected from the intermediate transfer belt 8, and there is almost no light reflected from the toner. Therefore, when the density of a toner image increases, the specular reflected light component detected by the PD 72 decreases. The memory 802 stores the relationship between the density of the toner image and the diffuse reflected light and the specular reflected light of each color. The CPU 801 calculates the density of the toner images based on the detected diffuse reflected light and the specular reflected light by referring to this relationship. The CPU 801 obtains a density profile of each of the test images TpY to TpK by sequentially detecting the density of the toner image at a predetermined sampling rate.

In step S904, the CPU 801 detects periodic density unevenness with respect to the developing sleeves 31 from the density profiles of the test images TpY to TpK. For example, for the CPU 801, the relationship between the amplitude of the density (unevenness) and the phase is extracted. Specifically, the CPU 801 performs Fourier-transform on the density profile to obtain the amplitude and the phase of the respective frequency components, and extracts the density unevenness component caused by the rotation period of the developing sleeve 31 based on the amplitude and the phase. As an example, it is assumed that the process speed of the image forming apparatus 101 is 240 mm/s, the diameter of the developing sleeve 31 is 20 mm, and the peripheral speed ratio of the developing sleeve 31 with respect to the photosensitive member 1 is 180%. Here, the rotation period of the developing sleeve 31 is 145 ms. The CPU 801 stores an amplitude D and a phase 1 of the density unevenness component caused by the developing sleeve 31 in the memory 802.

In step S905, the CPU 801 determines a correcting bias ΔVdc for correcting the developing bias Vdc based on the amplitude D and the phase 1. Here, correcting the developing bias Vdc means determining a correction amount (correcting bias ΔVdc) of the developing bias Vdc for each rotational phase of the developing sleeve 31.

$$\Delta Vdc = Va \times \cos(\omega t + \theta) \quad \text{Eq1}$$

Here, Va is referred to as a developing contrast difference, and is a potential difference (amplitude) corresponding to the amplitude D at the slope of the development gamma characteristic. ω is the angular velocity of the developing sleeve 31. t is time. The phase θ is defined by the following equation.

$$\theta = \Phi - \omega \times \Delta t + \pi \quad \text{Eq2}$$

Here, Δt is a time difference from when an image is formed until when the image is detected by the density sensor 70. Δt is obtained from the process speed S and the distance ds from the developing device 3 to the density sensor 70 by the following equation.

$$\Delta t = ds/S \quad \text{Eq3}$$

The developing bias Vdc is modulated with a phase opposite to the density unevenness so that a developing contrast Vcont corresponding to the amplitude D of the density unevenness is generated. As a result, the density unevenness component depending on the developing sleeve 31 is cancelled out. Note that the phase difference corresponding to the time difference from the developing device 3 to the density sensor 70 is also taken into consideration. More specifically, the CPU 801 calculates a developing contrast difference (amplitude Va) corresponding to the amplitude D from the amplitude D and the slope of the development gamma characteristic. The CPU 801 stores the developing contrast difference (amplitude Va), the angular velocity co, and the phase θ in the memory 802.

In step S906, the CPU 801 determines whether the amplitude Va of the correcting bias ΔVdc exceeds a threshold Vth. As one example, if the Vback latitude is 80 V, the threshold Vth is determined to be 40 V. However, if a margin of about 10 V is allocated, the threshold Vth is set to 35 V ((80V−10V)/2=35V). If the amplitude Va exceeds the threshold Vth, the CPU 801 advances the processing to step S907. If the amplitude Va does not exceed the threshold Vth, the CPU 801 advances the processing to step S908.

In step S907, the CPU 801 corrects (restricts) the amplitude Va so that the fogging removal voltage Vback falls within the Vback latitude. This corresponds to the amplitude Va being corrected to be less than or equal to the threshold Vth. For example, the CPU 801 may replace the amplitude Va in the equation Eq1 with a threshold Vth.

$$\Delta Vdc = Vth \times \cos(\omega t + \theta) \quad \text{Eq4}$$

In step S908, the CPU 801 stores the correcting bias ΔVdc in the memory 802. That is, the CPU 801 may store the equation Eq1 or the equation Eq4 which are correction equations of the developing bias Vdc in the memory 802. For example, the correcting bias ΔVdc for each rotational phase with respect to the home position may be obtained in advance and stored in the memory 802. A set consisting of a plurality of pairs of the rotational phase and the correcting bias ΔVdc may be referred to as a correcting bias waveform.

[Operation after Correction of Density Unevenness]

When an instruction to form an image is given by the user, the CPU 801 detects the home position, reads the correcting bias ΔVdc for each rotational phase with respect to the home position from the memory 802, and corrects the developing bias Vdc. For example, the developing bias Vdc is modulated by the correcting bias ΔVdc being added to the initial value of the developing bias Vdc. Note that the correcting bias ΔVdc for each rotational phase may be calculated from an equation or a coefficient stored in the memory 802.

Effect of the Invention

Figure 11A:
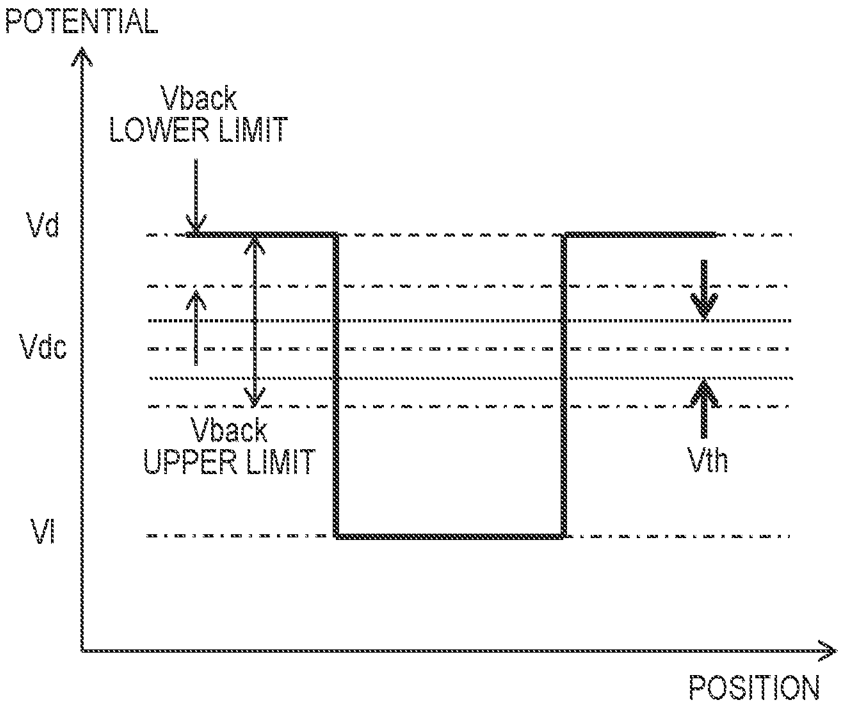
FIGS. 11A and 11B are views for describing the Vback latitude, Vth, and Va.

According to the first embodiment, the threshold Vth is set in consideration of a margin with respect to the Vback latitude. As shown in FIG. 11A, if the amplitude of the developing bias Vdc is equal to or less than the threshold Vth, the fogging removal voltage Vback falls within a range from the lower limit to the upper limit of Vback latitude. That is, fogging is reduced and excessive adhesion of the carrier is suppressed.

Figure 11B:
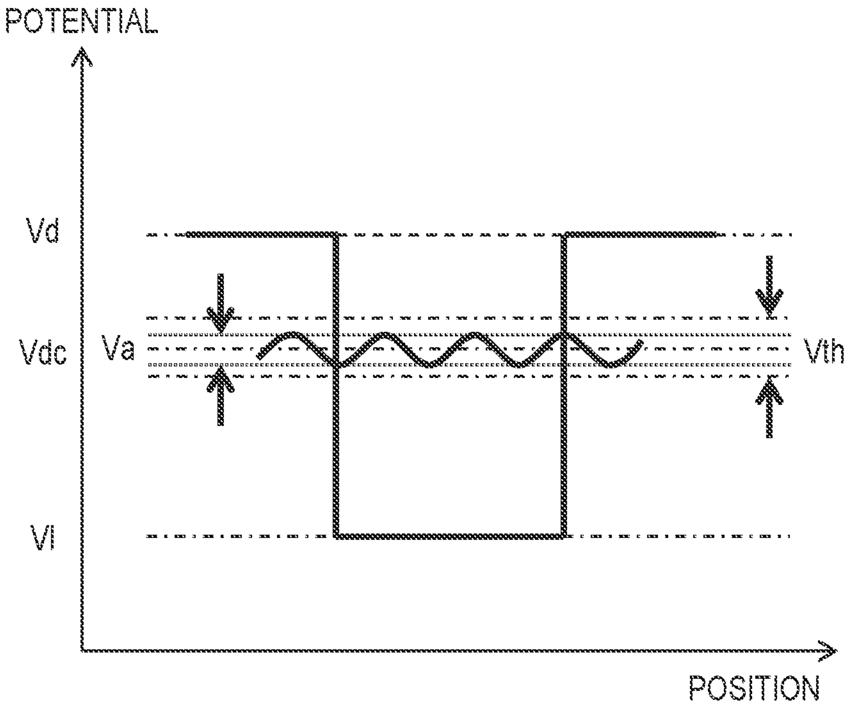

When the slope of the development gamma characteristic is 0.004, the developing contrasts Vcont corresponding to the amplitudes D=0.2 and D=0.4 are 50 V and 100 V, respectively. These values are Va. When D=0.2, Va<Vth holds true. As shown in FIG. 11B, even if the developing bias Vdc is caused to be modulated by the amplitude Va, the developing bias Vdc falls within the range of the Vback latitude.

Figure 12A:
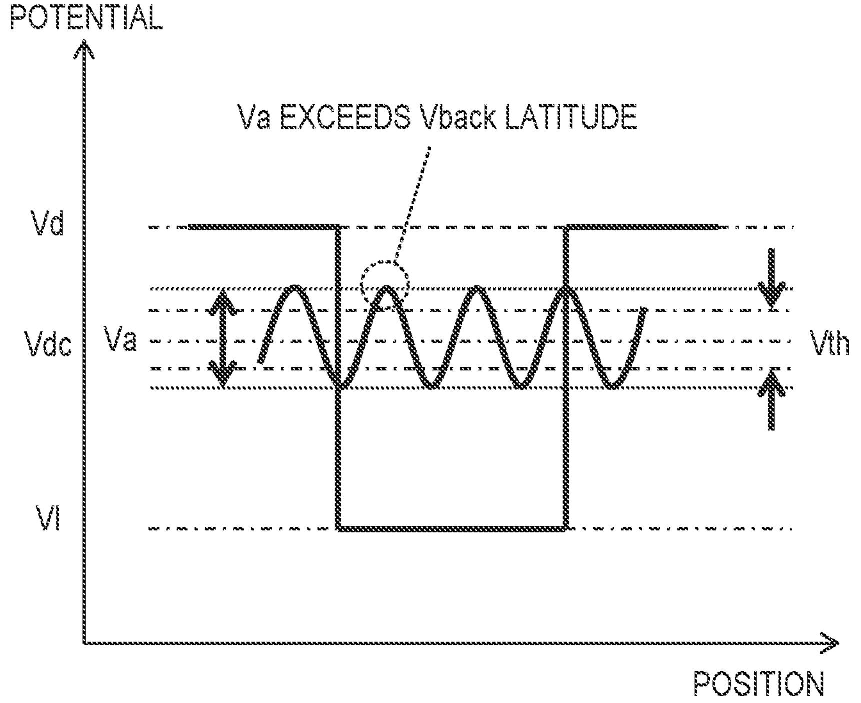
FIGS. 12A and 12B are views for describing the Vback latitude, Vth, and Va.

On the other hand, when D=0.4, Va□Vth holds true. If in a case where the correcting bias ΔVdc is not changed, the amplitude Va of the developing bias Vdc exceeds the threshold Vth as shown in FIG. 12A. In other words, the fogging removal voltage Vback may deviate from the tolerable range (Vback latitude).

Figure 12B:
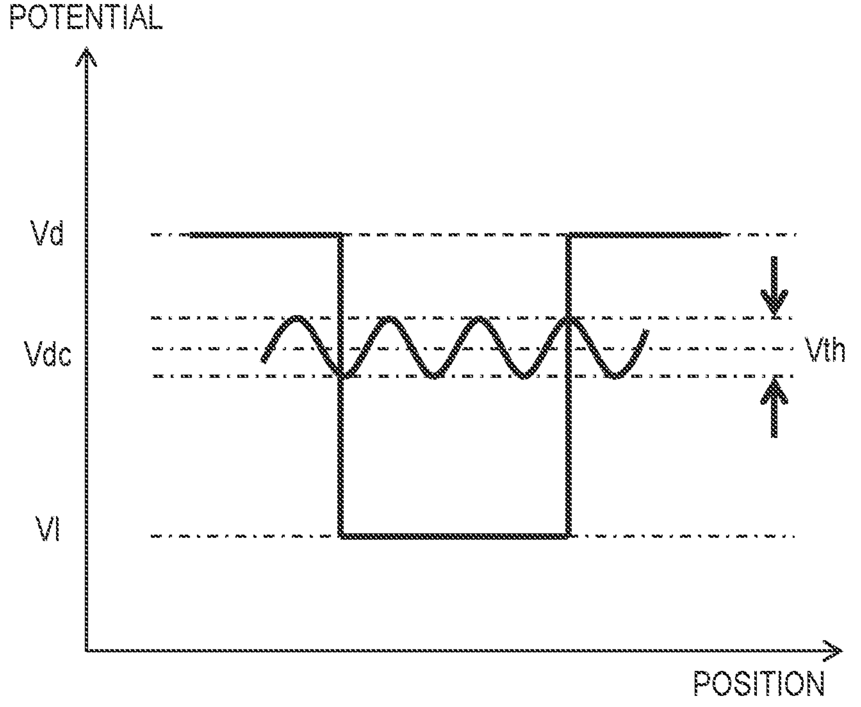

In the first embodiment, the amplitude Va is replaced with a threshold Vth when the amplitude Va exceeds the threshold Vth. As shown in FIG. 12B, the developing bias Vdc is modulated with a correcting bias ΔVdc of the amplitude Va. Therefore, the amplitude Va of the corrected developing bias Vdc becomes less than or equal to the threshold Vth, and the fogging removal voltage Vback falls within Vback latitude.

According to the first embodiment, the correcting bias ΔVdc of the developing bias Vdc is determined based on the periodic density variation information extracted from the density information of a test image. The amplitude Va of the developing bias Vdc is determined such that it does not exceed the threshold Vth. Therefore, periodic density unevenness is reduced in a range in which fogging is reduced and excessive adhesion of carrier is suppressed. Thus, balance is achieved for the reduction of periodic density unevenness, the reduction of fogging, and the suppression of carrier adhesion.

In the first embodiment, the density unevenness caused by the developing sleeve 31 is extracted from the detection results of the test images, and the developing bias Vdc is modulated by the correcting bias ΔVdc so that the extracted density unevenness is reduced. However, this is only an example. The image forming condition may be corrected based on the detection result so that the amplitude Va is equal to or smaller than the threshold Th. For example, a periodic density unevenness component caused by the photosensitive member 1 may be extracted from the detection result of the test image, and the charging bias Vc may be modulated based on the extraction results.

In the first embodiment, the density of a test image formed on the intermediate transfer belt 8 is detected, but this is merely an example. The density of a test image formed on a sheet P may be detected. In this case, the test image may be read by an image scanner or may be read by the density sensor 70 located downstream of the fixing apparatus 17.

Second Embodiment

[Summary]

In the first embodiment, a modulation amplitude (amplitude Va) of the developing bias Vdc is determined based on the threshold Vth in the density unevenness correction. The threshold Vth is determined based on the Vback latitude, but the Vback latitude is influenced by environmental conditions. Therefore, in the second embodiment, adaptively controlling the threshold Vth according to the surrounding environment of the image forming apparatus 101 is proposed. For the description of matters common to the first embodiment, the descriptions of the first embodiment are incorporated in the second embodiment.

As illustrated in FIG. 1, the image forming apparatus 101 includes an environment sensor 80. The environment sensor 80 is arranged at a place near the outer surface of the housing of the image forming apparatus 101. This allows the CPU 801 to accurately measure environmental conditions (temperature and relative humidity, for example) around the image forming apparatus 101.

[Development Gamma Characteristic and Vback Latitude]

Figure 13:
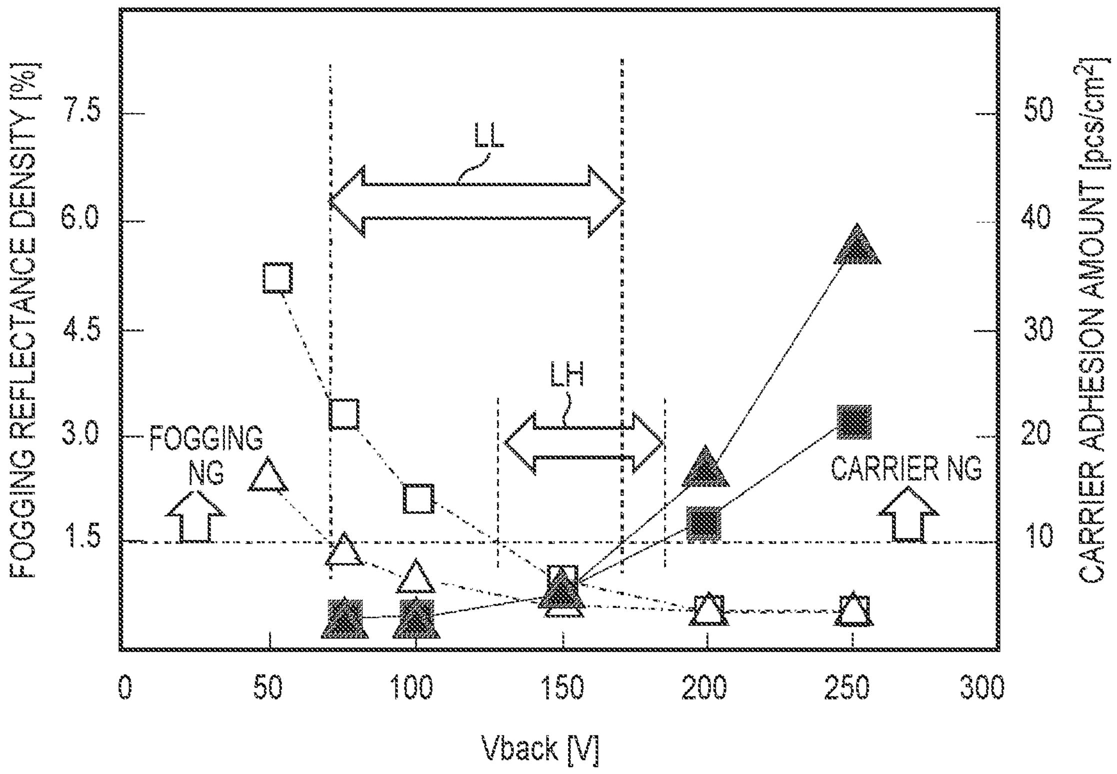
FIG. 13 is a view for describing a relationship between an environmental condition and the Vback latitude.

FIG. 13 shows a relationship between the fogging removal voltage Vback and the reflectance density of fogging, and the relationship between the fogging removal voltage Vback and amount of carrier adhered. The Vback latitude is defined as described in the first embodiment. The white triangles indicate the reflectance density of the fogging in the non-exposure region in a low-moisture environment. A low-moisture environment is, for example, an environment in which the temperature is 23° C., the relative humidity is RH 5%, and the absolute water content is 1 g/m$^3$. The black triangles indicate the amount of carrier adhering in the non-exposure region in a low-moisture environment. The white squares indicate the reflectance density of the fogging in the non-exposure region in a high-moisture environment. A high-moisture environment is, for example, an environment in which the temperature is 30° C., the relative humidity is RH 80%, and the absolute water content is 22 g/m$^3$. The black squares indicate the amount of carrier adhering in the non-exposure region in a high-moisture environment.

According to FIG. 13, the tolerable range of fogging removal voltage Vback with respect to fogging and carrier in a low-moisture environment ranges from 70 V to 170 V. That is, the Vback latitude LL of the low-moisture environment is 100 V. Meanwhile, the tolerable range of fogging removal voltage Vback with respect to fogging and carrier in a high-moisture environment ranges from 130 V to 185 V. That is, the Vback latitude LH of the high-moisture environment is 55 V.

[Density Unevenness Correction]

Figure 14:
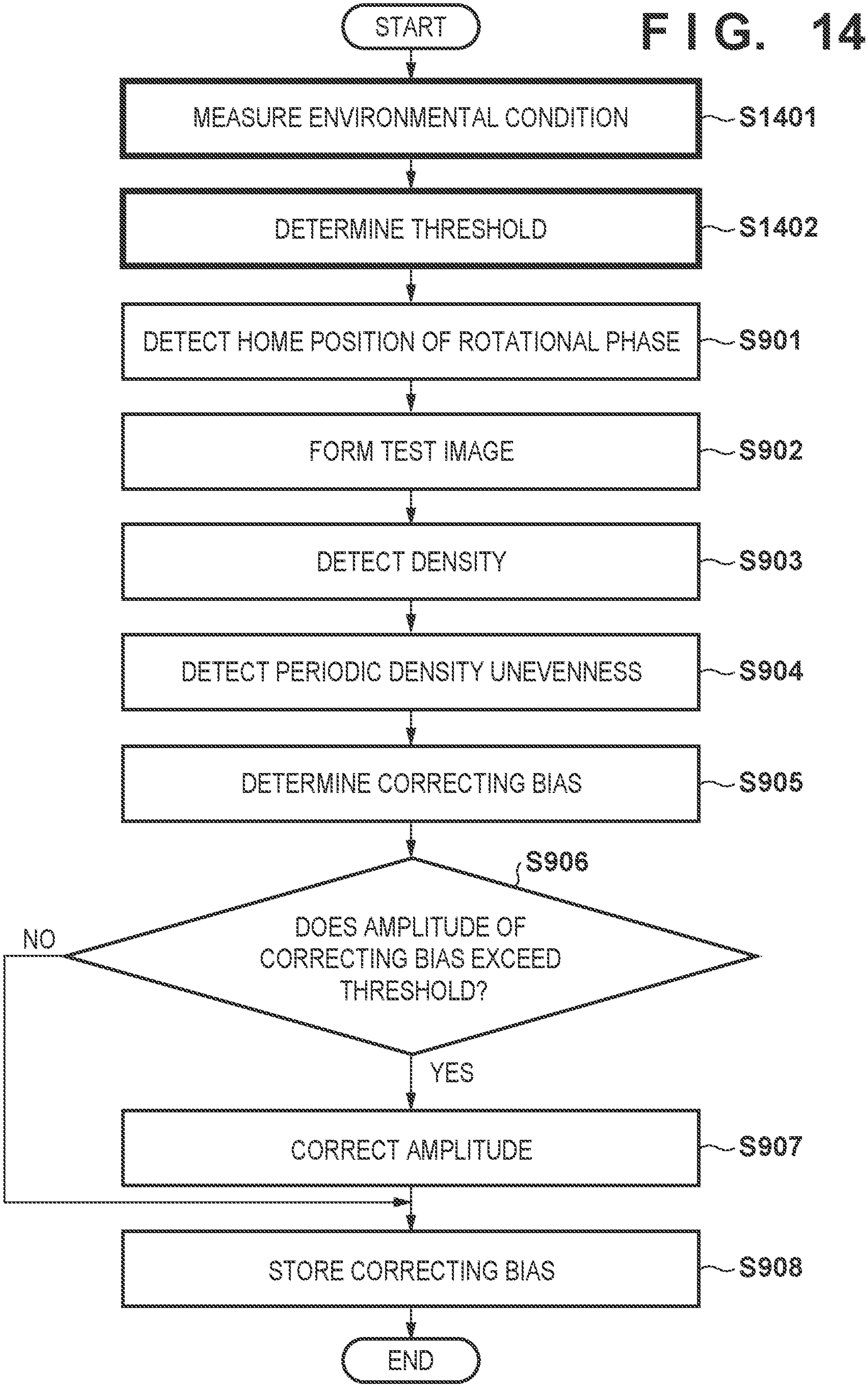
FIG. 14 is a flowchart illustrating a method for correcting density unevenness.

FIG. 14 is a flowchart illustrating a method of correcting density unevenness according to the second embodiment. Compared to FIG. 9, FIG. 14 differs in that step S1401 and step S1402 are added prior to step 901.

In step S1401, the CPU 801 obtains the environmental condition using the environment sensor 80. Here, the environmental condition may be any parameter that correlates with the Vback latitude. Here, the temperature and relative humidity are detected. The CPU 801 further calculates the absolute water content Awc based on the temperature T (° C.) and the relative humidity Rh (%) by the following equations.

$$Awc=(Rws\times Rh)/(T+273) \qquad \text{Eq5}$$

$$Rws=6.1164\times 10^{C} \qquad \text{Eq6}$$

$$C=(7.591\times(T+273))/(240.7+(T+273)) \qquad \text{Eq7}$$

In step S1402, the CPU 801 determines the threshold Vth based on the absolute water content Awc. For example, a table describing the relationship between the threshold Vth and the absolute water content Awc may be stored in the ROM area of the memory 802. The CPU 801 refers to this table and determines the threshold Vth corresponding to the absolute water content Awc.

Figure 15:
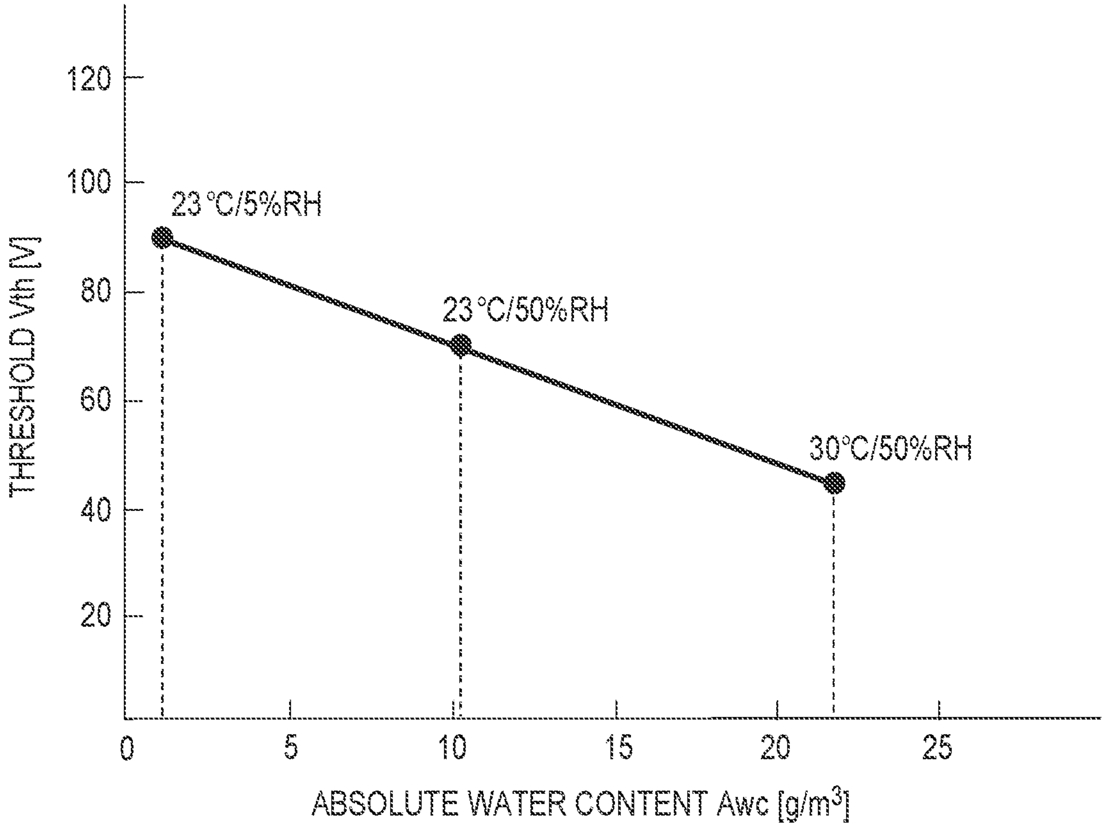
FIG. 15 is a view for describing a relationship between an environmental condition and a threshold.

FIG. 15 shows the relationship between the threshold Vth and the absolute water content Awc. The threshold Vth is set in consideration of a margin of 10V with respect to the Vback latitude correspond to the absolute water content Awc. That is, the threshold Vth is set by subtracting the margin from Vback latitude to obtain a difference, and then dividing the difference by 2.

Effect of the Invention

In the second embodiment, the threshold Vth is adaptively controlled according to an environmental condition. Therefore, even if the installation environment of the image forming apparatus 101 changes, fogging is reduced and excessive adhesion of carrier is suppressed, and density unevenness caused by the rotating body is reduced.

In FIG. 1, the environment sensor 80 is arranged to detect an environmental condition of an installation environment of the image forming apparatus 101. However, this is merely one example. The environment sensor 80 may be installed so as to be able to detect environmental conditions in the vicinity of the developing device 3. This is because the cause of the change in the Vback latitude is that the toner, carrier, and chargeability are affected by the environmental conditions.

Third Embodiment

[Summary]

In the first embodiment, it is assumed that the density unevenness component caused by the developing sleeve 31 is detected from the density information of the test image. In the third embodiment, it is assumed that the density unevenness component caused by the developing sleeve 31 and the density unevenness component caused by the photosensitive member 1 are detected from the density information of the test image. That is, the correcting bias ΔVdc of the developing bias Vdc and the correcting bias ΔVc of the charging bias Vc are obtained. In the third embodiment, the amplitude of the developing bias Vdc and the amplitude of the charging bias Vc are respectively modulated so as not to deviate from the Vback latitude. That is, the amplitude Va of the correcting bias ΔVdc is restricted according to the threshold Vth, and the amplitude Vb of the correcting bias ΔVc is restricted according to the threshold Vth'. In a case where a plurality of density unevenness components having different periods in density unevenness are present, the density unevenness component having high visibility is preferentially reduced. If the amplitude of a density unevenness component having high visibility is less than the threshold, the density unevenness component having low visibility is also reduced.

The process speed of the image forming apparatus 101 according to the third embodiment is assumed to be 240 mm/s. The diameter of the developing sleeve 31 is assumed to be 20 mm. The diameter of the photosensitive member 1 is assumed to be 30 mm. The peripheral speed ratio between the developing sleeve 31 and the photosensitive member 1 is assumed to be 180%. Here, the circumferential length of the developing sleeve 31 is 35 ms. The circumferential length of the photosensitive member 1 is 94 mm. Therefore, the density unevenness component caused by the developing sleeve 31 has higher visibility than the density unevenness component caused by the photosensitive member 1. Therefore, in the third embodiment, correction of the density unevenness component caused by the developing sleeve 31 is prioritized. For the description of matters common to the first and second embodiments, the descriptions of the first and second embodiments are incorporated in the third embodiment.

[Density Unevenness Correction]

Figure 16:
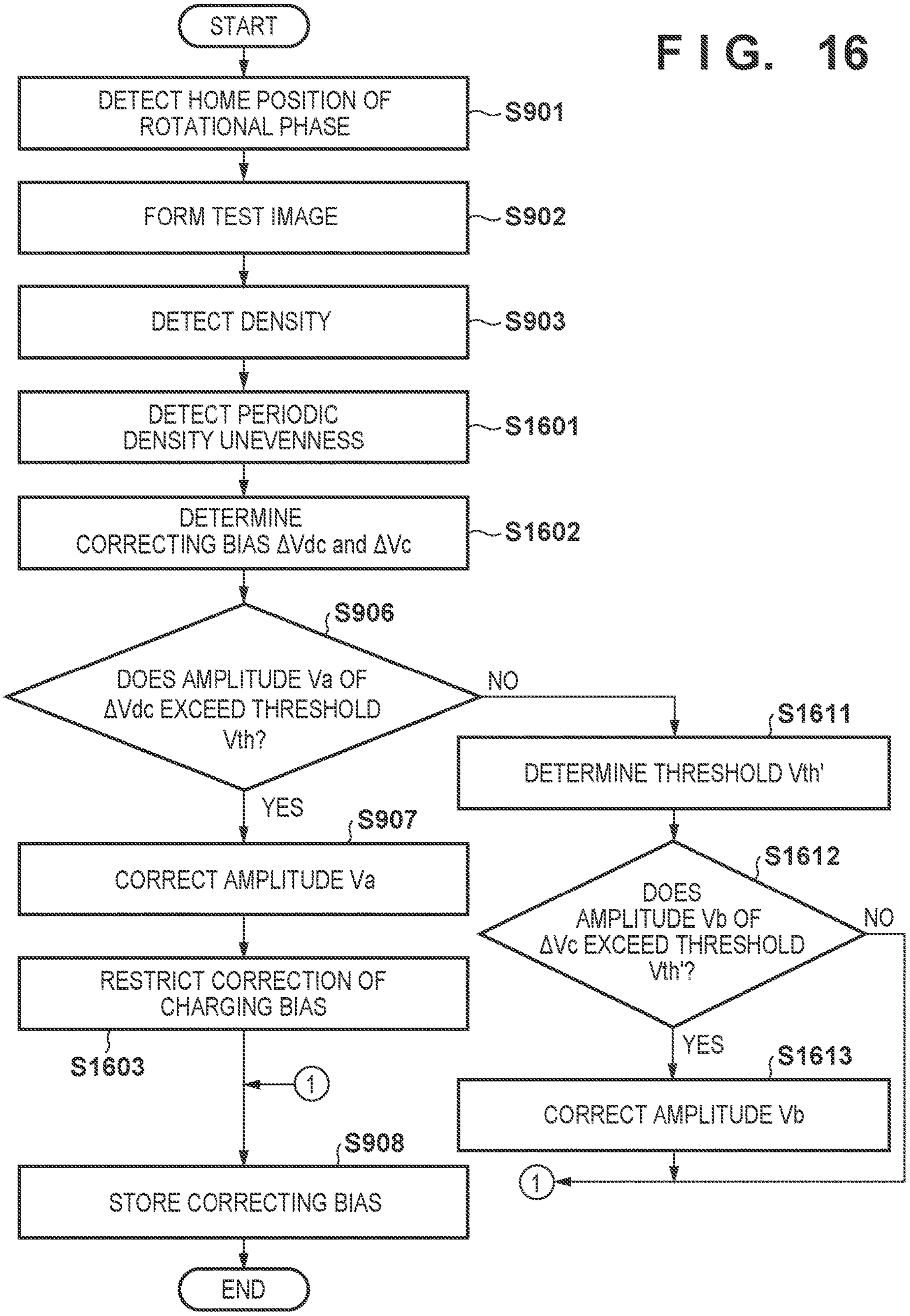
FIG. 16 is a flowchart illustrating a method for correcting density unevenness.

FIG. 16 is a flowchart illustrating a method of correcting density unevenness according to the third embodiment. In FIG. 16, descriptions of the matters common to those in FIG. 9 are omitted.

In step S1601, the CPU 801 detects periodic density unevenness based on the detection result (density profile) of a test image. Here, the density unevenness component caused by the developing sleeve 31 and the density unevenness component caused by the photosensitive member 1 are detected. As described above, these density components comprise amplitude and phase information. Note, the rotation period of the developing sleeve 31 is 145 ms, and the rotation period of the photosensitive member 1 is 392 ms. The amplitude of the density unevenness of the developing sleeve 31 is expressed as Ds, and the phase thereof is expressed as Φs. Similarly, the amplitude of the density unevenness of the photosensitive member 1 is expressed as Dd, and the phase thereof is expressed as Φd.

In step S1602, the CPU 801 determines the correcting bias ΔVdc of the developing bias Vdc and the correcting bias ΔVc of the charging bias Vc. The correcting bias ΔVdc is calculated from the equation Eq1. The correcting bias ΔVc is calculated from the following equation.

$$\Delta Vc = Vb \times \cos(\omega 2 \times t + \theta 2) \quad \text{Eq8}$$

Here, Vb is referred to as a developing contrast difference, and is a potential difference (amplitude) corresponding to the amplitude Dd at the slope of the development gamma characteristic. ω2 is an angular velocity of the photosensitive member 1. The phase θ2 is defined by the following equation.

$$\theta 2 = \Phi d - \omega 2 \times \Delta t + \pi \quad \text{Eq9}$$

In step S906, in a case where the amplitude Va exceeds the threshold Vth, the CPU 801 advances the processing to step S907. In step S907, the amplitude Va is corrected to the threshold Vth. Then, in step S1603, the CPU 801 restricts the correction of the charging bias Vc. For example, the CPU 801 may prohibit correcting the charging bias Vc by substituting 0 for ΔVc. Thereafter, the CPU 801 advances the process to step S908.

In step S906, in a case where the amplitude Va does not exceed the threshold Vth, the CPU 801 advances the processing to step S1611. In step S1611, the CPU 801 determines the threshold Vth' for the charging bias Vc. The threshold Vth' may be determined using, for example, the following equation.

$$Vth' = Vth - Va \quad \text{Eq10}$$

In step S1612, the CPU 801 determines whether the amplitude Vb of the correcting bias ΔVc exceeds a threshold Vth'. If the amplitude Vb does not exceed the threshold Vth', the CPU 801 advances the processing to step S908. On the other hand, if the amplitude Vb exceeds the threshold Vth', the CPU 801 advances the processing to step S1613.

In step S1613, the CPU 801 corrects the amplitude Vb. For example, the CPU 801 may replace the amplitude Vb in the equation Eq8 with a threshold Vth' in equation Eq10.

$$\Delta Vc = Vth' \times \cos(\omega 2 \times t + \theta 2) \quad \text{Eq11}$$

Finally, in step S908, the CPU 801 stores the correcting biases ΔVdc and ΔVc in the memory 802.

[Operation after Correction of Density Unevenness]

The CPU 801 causes the high-voltage power supply 809 to output a bias that is the sum of the developing bias Vdc and the correcting bias ΔVdc, and applies the bias to the developing sleeve 31. In parallel with this, an AC component of the developing voltage is also applied to the developing sleeve 31. That is, the high-voltage power supply 809 outputs a voltage that is the sum of the AC component of the developing voltage, the developing bias Vdc, and the correcting bias ΔVdc. Similarly, the CPU 801 causes the high-voltage power supply 809 to output a bias that is the sum of the charging bias Vc and the correcting bias ΔVc, and applies the bias to the charging roller 2.

Effect of the Invention

In the third embodiment, in a case where a plurality of density unevenness components each having different periods are present, a density unevenness component that is visually noticeable is preferentially reduced. As a result, even when a plurality of density unevenness components having different periods are present, it is possible to balance the reduction of fogging, the reduction of the amount of carrier adhered, and the reduction of density unevenness. Note that in the third embodiment, adaptive control of the threshold Vth according to the environmental condition described in the second embodiment may be adopted.

In the third embodiment, the correction of the density unevenness component caused by the developing sleeve 31 is prioritized over the correction of the density unevenness component caused by the photosensitive member 1, but this is merely an example. In a case where the density unevenness component caused by the photosensitive member 1 is visually more noticeable than the density unevenness component caused by the developing sleeve 31, the density unevenness component caused by the photosensitive member 1 is preferentially corrected.

Technical Concepts Derived from Embodiments

[Aspect 1]

The photosensitive member 1, the charging roller 2, the developing device 3, and the secondary transfer roller 11 are examples of an image forming unit that forms a toner image on a sheet using a rotating body. In particular, the charging roller 2 is an example of a charging member (charging device) that charges the surface of the photosensitive member 1 to a uniform potential (dark portion potential). The exposure apparatus 7 is an example of an exposure unit that forms an electrostatic latent image by exposing the surface of the photosensitive member 1. The developing sleeve 31 is an example of a developing rotary member that forms a toner image on the surface of the photosensitive member 1 by causing toner contained in the developer to adhere to an electrostatic latent image. The developing device 3 is an example of a developing device having a developing rotary member. The primary transfer roller 6, the intermediate transfer belt 8, and the secondary transfer roller 11 are examples of a transfer unit that transfers a toner image to a sheet or an intermediate transfer member. The drum cleaner 4 is an example of a cleaning unit that cleans the photosensitive member 1. The density sensor 70 is an example of a sensor that detects density unevenness of a toner image. The high-voltage power supply 809 is an example of a generation circuit that generates a voltage (for example, a charging bias Vc and a developing bias Vdc) to be applied to the rotating body. That is, the high-voltage power supply 809 functions as a generation circuit that generates a developing voltage, which is a developing bias applied to the developing rotary member, that includes a DC component and an AC component, and a charging voltage that is supplied to the charging device. The CPU 801 is an example of a controller for causing the voltage to be modulated such that the density unevenness is reduced by controlling a generation circuit. For example, the CPU 801 functions as a controller for causing the DC component of the developing voltage to be modulated based on a first correction component such that the density unevenness is reduced by controlling the generation circuit. The CPU 801 restricts the amplitude of the voltage by modulating the voltage so that fogging of toner and the adhesion of carrier contained in the developer, which becomes the source of the toner image, to the photosensitive member are reduced. For example, the CPU 801 restricts the first correction component (ΔVdc, for example) for modulating the DC component of the developing voltage such that the fogging of toner and the adhesion of the carrier is reduced. As a result, the occurrence of fogging and the adhesion of the carrier are suppressed while the density unevenness is improved.

[Aspect 2]

The potential difference between the dark portion potential Vd, which is a charge potential in the non-exposure region of the surface of the photosensitive member 1, and the developing bias Vdc supplied to the developing device carrying the developer is called a fogging removal voltage Vback. The CPU 801 may restrict the amplitude of the voltage due to the modulation of the voltage so that the fogging removal voltage Vback falls within a predetermined range (Vback latitude).

[Aspect 3]

The CPU 801 may be configured to detect a density profile which is a set of a plurality of densities sampled at a predetermined sampling period by the density sensor 70. Here, the sampling period is set to be equal to or less than half of the shortest period among the periods of the plurality of density unevenness components (sampling theorem). The CPU 801 modulates the DC component (developing bias) of the developing voltage with a correction amount (first correction component) according to the density profile. The density profile is a set of densities for each rotational phase starting from the home position of the rotating body. The time transition and rotational phase are correlated parameters. A set of correction amounts obtained from the density profile is also a set of correction values (correction amplitude or modulation amplitude) for each rotational phase starting from the home position of the rotating body. The correction value is a parameter involving the density. Therefore, in a broad sense, the set of correction values is also a density profile.

[Aspects 4 and 5]

There may be a case where the amplitude Va of the DC component of the developing voltage modulated according to the first correction component exceeds an upper limit (for example, Vth) of a predetermined range. In this case, the CPU 801 may restrict the amplitude of the DC component of the developing voltage modulated according to the first correction component by reducing the first correction component. For example, the first correction component (for example, correcting bias ΔVdc) is added to the DC component of the developing voltage, so that the DC component of the developing voltage is modulated according to the first correction component. In a case where the amplitude of the DC component of the developing voltage modulated according to the first correction component exceeds a predetermined threshold, the CPU 801 replaces the first correction component with a predetermined value equal to or less than the threshold. In the embodiment described above, the first correction component is replaced with a threshold, but the first correction component may be replaced with a value lower than the threshold.

[Aspects 6 and 7]

The environment sensor 80 is an example of a second sensor that detects an environmental condition in which the image forming apparatus 101 is installed. The CPU 801 may be configured to adjust a predetermined range (the Vback latitude and Vth, for example) according to the environmental condition. As a result, even if an environmental condition changes, the occurrence of fogging and the adhesion of the carrier are suppressed while the density unevenness is improved. The environmental condition may be absolute water content.

[Aspects 8, 9, and 12]

The CPU 801 controls the generation circuit so as to modulate the voltage of at least one of the charging bias and the developing bias. The CPU 801 restricts the amplitude of the voltage so that the potential difference (Vback, for example) between the dark portion potential Vd and the developing bias Vdc falls within a predetermined range (Vback latitude, for example). For example, the CPU 801, by controlling the high-voltage power supply 809, may module the charging voltage (the charging bias Vc, for example) based on a second correction component (the correcting bias ΔVc, for example) so as to reduce density unevenness. The CPU 801 may restrict the second correction component such that fogging of toner and adhesion of the carrier to the photosensitive member are reduced.

[Aspect 10]

As suggested in the third embodiment, there may be a case where the density unevenness component caused by the photosensitive member 1 is larger than the density unevenness component caused by the developing rotary member. Here, the CPU 801 may modulate the charging bias in preference to the developing bias. As more specifically described in the third embodiment, it may also be a case where the density unevenness component caused by the photosensitive member is smaller than the density unevenness component caused by the developing rotary member. Here, the CPU 801 may modulate the developing bias in preference to the charging bias.

[Aspect 11]

As shown in equation Eq1, the CPU 801 may calculate a correcting bias ΔVdc of the developing bias for reducing density unevenness components caused by the developing rotary member. In a case where the amplitude Va of the correcting bias ΔVdc exceeds the first threshold (Vth, for example), configuration may taken so that the threshold Va of the correcting bias is caused to be reduced, and the correcting bias ΔVc of the charging bias for reducing the density unevenness component caused by the photosensitive member 1 is set to zero. There may be a case where, the amplitude Va of the correcting bias ΔVdc does not exceed the first threshold. Here, the CPU 801 may calculate a second threshold (Vth', for example) from the difference between the correcting bias ΔVdc and the first threshold. There may be a case where the correcting bias ΔVc of the charging bias for reducing the density unevenness component caused by the photosensitive member 1 exceeds the second threshold. In this case, the CPU 801 may reduce the amplitude Vb of the correcting bias ΔVc.

[Aspect 12]

Note that configuration may be taken such that only the charging bias is corrected without the developing bias being corrected. For example, the CPU 801 functions as a controller for causing the charging voltage to be modulated based on the correction component such that the density unevenness is reduced by controlling the high-voltage power supply 809. The CPU 801 may restrict the correction component (correcting bias ΔVc) such that fogging of toner and adhesion of the carrier to the photosensitive member are reduced.

[Other]

The memory 802 is an example of a holding unit that holds a profile representing the relationship between the rotational phase of the photosensitive member 1 or the developing rotary member and the amplitude of the density unevenness based on the detection result of the test image by the sensor. The CPU 801 functions as a correction unit that corrects the amplitude of the charging bias or the developing bias according to the profile so that the density unevenness is reduced. The CPU 801 restricts the correction of the charging bias or the amplitude of the developing bias so that fogging of toner and adherence of the carrier contained in the developer to the photosensitive member are reduced. The CPU 801 may restrict the correction of the amplitude of the charging bias or the developing bias depending on the tolerable range (Vback latitude) of the fogging removal voltage, which is the potential difference between the dark portion potential and the developing bias. The CPU 801 may restrict the correction of the charging bias or the amplitude of the developing bias for reducing density unevenness so that the fogging removal voltage falls within a predetermined tolerable range. The CPU 801 may function as an adjusting unit for adjusting the tolerable range (the Vback latitude, for example) in accordance with an environmental condition. That is, the CPU 801 modulates the charging bias and/or the developing bias on the condition that the fogging removal voltage Vback falls within the tolerable range.

As described in the third embodiment, when both the charging bias and the developing bias are corrected, there may be a case where the fogging removal voltage does not fall within the tolerable range. In this case, the CPU 801 may preferentially correct a bias, among the charging bias and the developing bias, that is more strongly involved in density unevenness.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise controller (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-184235, filed Nov. 11, 2021 which is hereby incorporated by reference herein in its entirety.

What is claimed is:

1. An image forming apparatus comprising:

a photosensitive member;

a charging device configured to charge a surface of the photosensitive member to be uniformly charged;

an exposure device configured to form an electrostatic latent image by exposing the surface of the photosensitive member;

a developing unit having a developing rotary member that forms a toner image onto the surface of the photosensitive member by causing toner included in a developer to adhere to the electrostatic latent image;

a transfer unit configured to transfer the toner image onto a sheet or an intermediate transfer member;

a first sensor configured to detect a density unevenness of the toner image;

a generation circuit configured to generate a developing voltage, which is a developing bias applied to the developing rotary member, that includes a direct current (DC) component and an alternating current (AC) component, and a charging voltage supplied to the charging device; and a controller configured to control the generation circuit to modulate the DC component of the developing voltage based on a first correction component such that the density unevenness is reduced, wherein the controller is further configured to restrict the first correction component for modulating the DC component of the developing voltage, such that fogging of toner that may occur on a non-exposure region which is not exposed by the exposure unit and adhesion to the photosensitive member of carrier included in the developer, which is a source of the toner image, are reduced.

2. The image forming apparatus according to claim 1, wherein the controller is further configured to restrict the first correction component such that a fogging removal voltage, which is a potential difference between a dark portion potential which is a surface potential on a non-exposure region in the surface of the photosensitive member, and the DC component of the developing voltage supplied to the developing rotary member, which carries the developer, falls within a tolerable range.

3. The image forming apparatus according to claim 2, wherein the first sensor is configured to detect a density profile which is a set of a plurality of densities sampled in a predetermined sampling period, and the controller is configured to modulate the DC component of the developing voltage by the first correction component according to the density profile.

4. The image forming apparatus according to claim 3, wherein the controller is configured to reduce the first correction component in a case where an amplitude of the DC component of the developing voltage modulated according to the first correction component exceeds the upper limit of the tolerable range.

5. The image forming apparatus according to claim 4, wherein the DC component of the developing voltage is modulated according to the first correction component by the first correction component being added thereto, and the controller is configured to, in a case where the first correction component exceeds a first threshold, replace the first correction component with a predetermined value that is equal to or less than the first threshold.

6. The image forming apparatus according to claim 5, further comprising a second sensor configured to detect an environmental condition in which the image forming apparatus is installed, wherein the controller is configured to adjust the tolerable range in accordance with the environmental condition.

7. The image forming apparatus according to claim 6, wherein the environmental condition includes an absolute water content.

8. The image forming apparatus according to claim 5, wherein the controller is further configured to modulate the charging voltage based on a second correction component by controlling the generation circuit so that the density unevenness is reduced, and restrict the second correction component such that the fogging of toner and adhesion of the carrier to the photosensitive member are reduced.

9. The image forming apparatus according to claim 8, wherein the controller is configured to restrict the second correction component such that a potential difference between the DC component of the dark portion potential and the developing voltage falls within a tolerable range.

10. The image forming apparatus according to claim 8, wherein the controller is configured to:

in a case where a density unevenness component caused by the photosensitive member is larger than a density unevenness component caused by the developing rotary member, modulate the charging voltage in preference over the DC component of the developing voltage; and in a case where a density unevenness component caused by the photosensitive member is smaller than a density unevenness component caused by the developing rotary member, modulate the DC component of the developing voltage in preference over the charging voltage.

11. The image forming apparatus according to claim 10, wherein the controller is configured to:

in a case where the first correction component exceeds a first threshold, reduce the first correction component, and set the second correction component, for reducing the density unevenness component caused by the photosensitive member, to zero;

in a case where the first correction component does not exceed the first threshold, calculate a second threshold from a difference between the first correction component and the first threshold; and in a case where the second correction component exceeds the second threshold, reduce the second correction component.

12. An image forming apparatus comprising:

a photosensitive member;

a charging device configured to charge a surface of the photosensitive member to be uniformly charged;

an exposure device configured to form an electrostatic latent image by exposing the surface of the photosensitive member;

a developing unit having a developing rotary member that forms a toner image onto the surface of the photosensitive member by causing toner included in a developer to adhere to the electrostatic latent image;

a transfer unit configured to transfer the toner image onto a sheet or an intermediate transfer member;

a sensor configured to detect density unevenness of the toner image;

a generation circuit configured to generate a developing voltage, which is a developing bias applied to the developing rotary member, that includes a direct current (DC) component and an alternating current (AC) component, and a charging voltage supplied to the charging device; and a controller configured to control the generation circuit to modulate the charging voltage to be modulated based on a correction component such that the density unevenness is reduced, wherein the controller is further configured to restrict the correction component such that fogging of toner that may occur on a non-exposure region which is not exposed by the exposure unit and adhesion to the photosensitive member of carrier included in the developer, which becomes the source of the toner image, are reduced.

* * * * *